(12) United States Patent
Hegemier et al.

(10) Patent No.: US 6,764,079 B1
(45) Date of Patent: Jul. 20, 2004

(54) VALVE SEAL ASSEMBLY WITH STRAIGHT-WALLED RETAINER

(75) Inventors: Timothy A. Hegemier, Avilla, IN (US); Alexander S. Williamson, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 83 days.

(21) Appl. No.: 10/126,565

(22) Filed: Apr. 19, 2002

(51) Int. Cl.$^7$ ................................................ F02F 11/00
(52) U.S. Cl. ..................... 277/502; 123/188.6; 277/437
(58) Field of Search ................................. 277/502, 435, 277/437; 123/188.6; 29/888.06, 0.061, 888.4, 0.46

(56) References Cited

U.S. PATENT DOCUMENTS

| | | | | |
|---|---|---|---|---|
| 1,924,403 A | * | 8/1933 | Hosmon et al. | ......... 123/188.6 |
| 2,547,257 A | * | 4/1951 | Cole | ........................... 277/575 |
| 2,821,973 A | * | 2/1958 | Guhman | .................. 123/188.6 |
| 3,480,286 A | * | 11/1969 | Kosatka | ....................... 277/502 |
| 3,625,525 A | * | 12/1971 | Davis, Jr. | .................... 277/502 |
| 3,829,105 A | * | 8/1974 | Kammeraad | ................. 277/502 |
| 4,509,473 A | * | 4/1985 | Hamparian | ............ 123/188.17 |
| 4,531,483 A | * | 7/1985 | Vossieck et al. | ......... 123/188.6 |
| 4,909,202 A | * | 3/1990 | Binford et al. | .......... 123/188.6 |
| 4,947,811 A | * | 8/1990 | Binford | .................... 123/188.6 |
| 4,993,379 A | * | 2/1991 | Viazzi | ......................... 277/502 |
| 5,002,018 A | * | 3/1991 | Strout | ....................... 123/188.6 |
| 5,072,950 A | * | 12/1991 | Littleproud et al. | ......... 277/502 |
| 5,237,971 A | * | 8/1993 | Worsley | ...................... 277/502 |
| 5,539,980 A | * | 7/1996 | Kammeraad et al. | .... 29/888.41 |
| 5,540,420 A | * | 7/1996 | Luzsicza | ................... 267/141.1 |
| 5,553,869 A | * | 9/1996 | Stamback | .................... 277/502 |
| 5,775,284 A | * | 7/1998 | Kirchner et al. | ......... 123/188.6 |
| 6,123,054 A | | 9/2000 | Netzer | |
| 6,209,504 B1 | | 4/2001 | Hegemier et al. | |
| 6,227,548 B1 | | 5/2001 | Netzer | |
| 6,231,050 B1 | * | 5/2001 | Raden | ......................... 277/598 |
| 6,244,235 B1 | | 6/2001 | Hegemier et al. | |
| 6,394,463 B1 | * | 5/2002 | Otani | .......................... 277/502 |
| 6,450,143 B1 | * | 9/2002 | Hegemier et al. | ....... 123/188.6 |

FOREIGN PATENT DOCUMENTS

| | | | |
|---|---|---|---|
| EP | 0136057 A2 | * | 4/1985 |
| GB | 2095348 A | * | 9/1982 |

* cited by examiner

Primary Examiner—Alison K. Pickard
(74) Attorney, Agent, or Firm—Rader, Fishman & Grauer PLLC

(57) ABSTRACT

A radially compliant valve stem seal assembly is adapted for installation over a valve guide of an internal combustion engine. The assembly includes a metallic cylindrical straight-walled retainer with an elastomeric sealing element chemically bonded to the interior surface of the retainer. The sealing element includes upper and lower portions; the upper portion includes a pair of sealing lips comprising an oil sealing lip and a gas sealing lip. The lips are adapted to meter oil through an interface between the seal assembly and the associated valve stem for assuring proper lubrication at the interface. The lower portion of the elastomeric sealing element provides one or more annular radially inwardly oriented gripping ribs adapted to engage the guide via an interference fit. The gripping ribs are adapted to balance forces of installation against those of securement of the valve stem seal assembly over a wide valve guide diameter tolerance range.

14 Claims, 1 Drawing Sheet

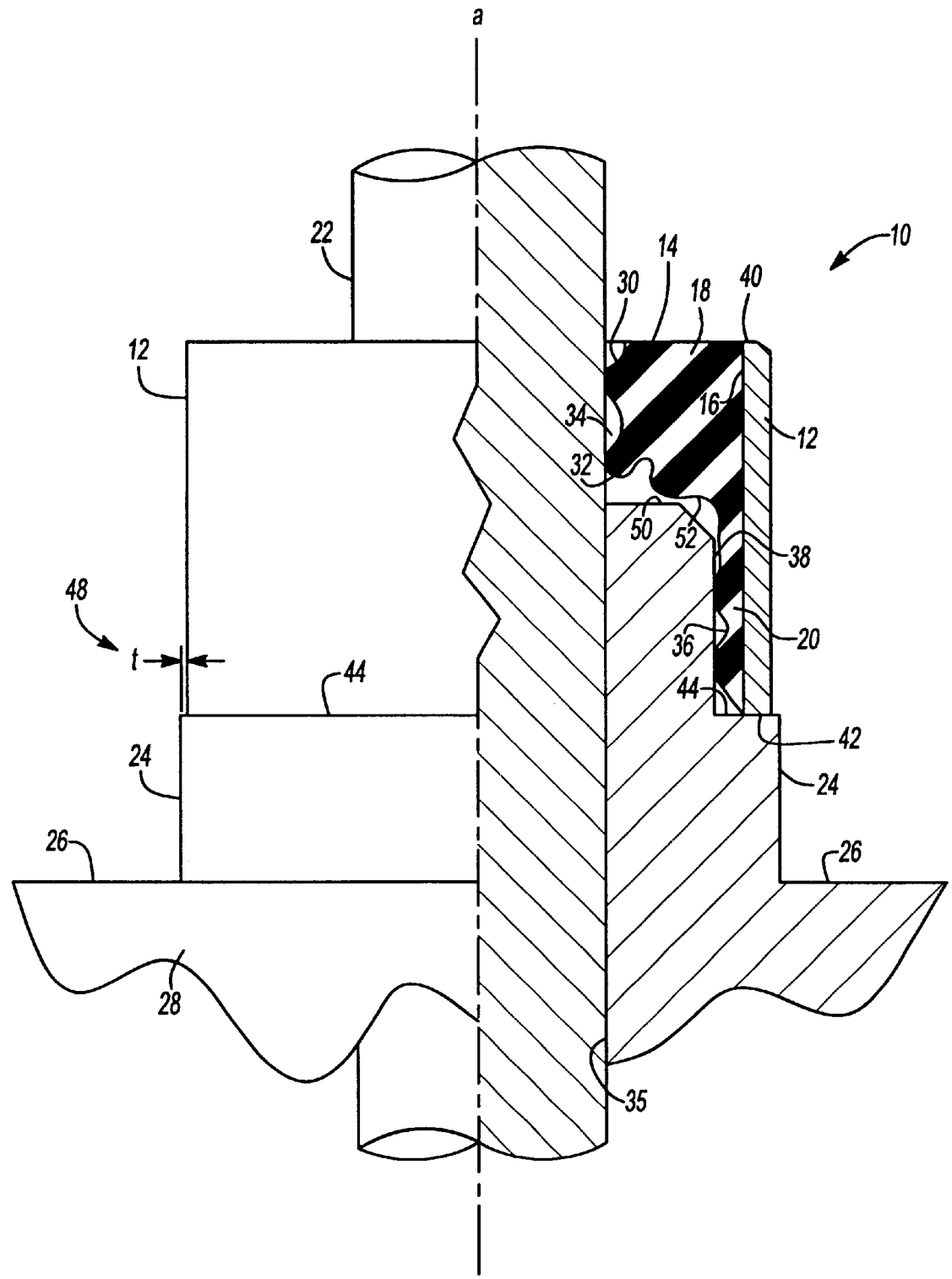

VALVE SEAL ASSEMBLY WITH STRAIGHT-WALLED RETAINER

BACKGROUND OF THE INVENTION

1. Field of Invention

The present invention relates to valve stem seal assemblies adapted to be installed over valve stems that are reciprocally movable within valve guides of internal combustion engines. More particularly, the invention relates to seal assembly retainers incorporating specially designed retention mechanisms for securement of such assemblies to valve guides.

2. Description of the Prior Art

Those skilled in the art will appreciate the manner in which intake and exhaust valves are employed in cylinder heads of internal combustion engines. Such valves, supported for reciprocal motion within valve guides, typically include integral elongated stems extending away from the engine cylinder heads, the ends of the stems interacting with rotating overhead cams for cyclic or repeated opening and closure of the valves against the force of valve return springs during the combustion cycle.

Obviously, in order to permit unobstructed reciprocal movement of the stem in the guide, some mechanical clearance must exist between the valve guide and the moving stem. A plurality of valve stems move reciprocally to and from the cylinder head, each within its individual guide, and so-called valve stem seal assemblies are used to seal against leakage of oil through a mechanical clearance path between each annular engine valve guide and its associated valve stem.

As is well known, the intake port of a combustion chamber is opened and closed by the reciprocating motion of at least one intake valve, which in turn is driven by the rotary motion of a cam, the latter being affixed to and rotatable with an engine camshaft. The intake valve permits fuel mixed with air to flow into the combustion chamber. In addition, most internal combustion engines have at least one exhaust valve and associated exhaust port for releasing expended combustion gases to the atmosphere. Typically, intake and exhaust valves are of similar construction, and both include stems integrally affixed to the valves.

In the typical engine, a valve stem seal assembly is fitted over or atop each valve guide, wherein each seal assembly includes a retainer frictionally mounted to an associated valve guide. Each valve stem seal assembly normally has two primary parts: 1) an elastomeric oil seal for controlling leakage of oil between the valve stem and guide as noted, and 2) a structural cylindrical retainer mounted atop of the valve guide to hold the oil seal in place.

Although valve stem seal elastomer body design, performance, and construction issues have seen much progress in recent years, there are current incentives to reduce manufacturing costs, particularly costs associated with the structural cylindrical retainers.

The valve stem seal retainer of the present invention addresses the noted manufacturing cost issues by providing a cost-effective, yet field flexible, design to accommodate a wide variety of valve guide geometries. Moreover, the structure is easily tailored to provide for proper retention of a valve stem seal assembly to a valve guide under a variety of installation and retention load requirements.

SUMMARY OF THE INVENTION

The disclosed invention is a one-piece valve stem seal and retainer assembly for an internal combustion engine. A plurality of such assemblies is contemplated for use in an engine, each designed for insertion over an engine valve guide for continuous engagement with an associated reciprocally moveable valve stem. The valve stem seal includes a retainer having a completely cylindrical, i.e. straight walled, metallic body. The body defines an interior surface to which an elastomeric sealing element is chemically bonded to provide a one-piece structure. The retainer is adapted to be inserted atop of an upper smaller diameter portion of a valve guide. It is inserted down over the guide to a point where it bottoms against a step formed between the upper smaller diameter portion and a lower larger diameter portion of the guide. The retainer is sized so as to provide a diametric offset with respect to the larger diameter portion of the guide; the offset provides a mechanism for avoiding interference between a valve return spring and the exterior retainer body. An upper section of the elastomeric sealing element contains a pair of sealing lips, including an oil sealing lip and a gas sealing lip. The upper portion of the sealing element also provides metering of a small amount of oil through the interface between the seal and associated valve stem for assuring adequate lubrication of the stem and guide interface.

A lower portion of the elastomeric sealing element includes one or more annular gripping ribs that engage the guide via interference fit to assure requisite valve stem seal retention force on the guide. Such force is sufficient to overcome countervailing forces tending to remove the seal from the guide that are created by reciprocal movement of the valve stem through the sealing lips. To the extent that the metallic retainer extends fully to the upper extremity of the elastomeric sealing element, the seal may be installed with a hammer, or other flat-faced tool, thus eliminating need for use of any special tool for its installation on a valve guide.

BRIEF DESCRIPTION OF THE DRAWING

The drawing is a partial cross-sectional view of a valve stem seal assembly constructed in accordance with this invention, wherein the assembly is shown installed over a valve guide of an internal combustion engine.

DETAILED DESCRIPTION OF PREFERRED EMBODIMENTS

Referring to the drawing, a valve stem seal assembly 10 includes a retainer 12 defined by a straight walled cross-section. Bonded to an interior surface 16 of the retainer 12 is an elastomeric sealing material, commonly referred to as a rubber jacket 14. An elastomeric upper body portion 18 and a contiguous elastomeric lower body portion 20 together define the jacket 14.

The valve stem seal assembly 10 is adapted to sealingly engage a valve stem 22 supported in an annular valve guide 24 for reciprocal movement of the stem in the guide along a longitudinal axis a—a, as will be appreciated by those skilled in the art. The valve guide 24 extends from an upper surface 26 of a cylinder head deck 28. For this purpose, the guide 24 may be machined from a cylinder head deck casting that includes the guide. Alternatively, the cylindrical guide 24 may be press fit into an aperture (not shown) formed in the cylinder head deck.

The upper body portion 18 of the rubber jacket 14 contains an oil sealing lip 30 adapted for contact with the cylindrical surface of the valve stem 22. In the described embodiment, longitudinally spaced from the lip 30 is also a gas sealing lip 32. The lip 32 is adapted to be positioned proximally to the interface between the valve stem 22 and the valve guide 24. Those skilled in the art will appreciate that the gas sealing lip 32 is not required in all applications. Whether or not present, however, those skilled in the art will also appreciate that the lip 30 (and lip 32) are sized to assure proper lubrication and consequent avoidance of premature damage to the lip 30 (and lip 32) due to friction, as well as any frictional scouring of the valve stem 22.

For this purpose, the space between the upper body portion 18 and the valve stem 22 characterizes a sealing interface 34 by which the oil sealing lip 30 and (the gas sealing lip 32) are effective for metering oil between the assembly 10 and the valve stem 22, and for assuring appropriate lubrication of a guide interface 35 between the valve stem and the valve guide 24.

The lower body portion 20 of the rubber jacket 14 is characterized by a plurality of gripping ribs 36. There are a pair of such ribs 36 in the described embodiment that are adapted to frictionally retain the valve assembly 10 on a reduced diameter portion 38 of the guide 24. Obviously, the ribs 36 are sized relative to the outside diameter of the reduced diameter portion 38 to provide a valve stem seal retention force capable of resisting mechanical pressures attempting to remove or dislodge the seal from the guide during engine operation. Although only two such ribs 36 are displayed in the described embodiment, the number of ribs can be varied, commensurate with retention force requirements for any given application.

As will be apparent from close review of the drawing, the reduced diameter portion 38 of the valve guide 24 creates an annular step 44 that is formed by the distinct diameters of the lower and upper, longitudinally and symmetrically aligned, portions 24 and 38 of the guide. The retainer 12 has an upper extremity 40, and a lower extremity 42; the lower extremity 42 bears against a step 44, and hence the step 44 acts as a positive insertion stop for the valve stem seal assembly 10 during installation. It will be appreciated that the upper extremity 50 of the guide portion 38 is vertically spaced from the bottom 52 of the upper body portion 18 to optimize sealing effectiveness.

In the described embodiment, an optional feature is included. It will be noted that the outside diameter of the retainer 12 is smaller than the outside diameter of the lower valve guide portion 24. As a result, there is a slight offset "t" (shown at 48) that characterizes a mechanism by which interference between a coil valve return spring (not shown) and the retainer 12 may be avoided. When this optional feature is absent, the outside diameter of the retainer is equal to the outside diameter of the lower valve guide portion 24, and is in no event wider than the portion 24.

In summary, this invention is characterized by a one-piece valve stem seal assembly 10 consisting of a steel retainer 12 with an elastomeric sealing element 14 chemically bonded to the retainer. The manufacture of the assembly 10 involves no special spring seat, and is thus less expensive to manufacture. Moreover, to the extent that the upper body portion 18 is unitary, requiring neither garter spring nor spring ring, the assembly 10 is manufactured with fewer parts than conventional valve stem seal assemblies. In addition, the straight walled retainer can be formed of cut steel tubing for simplicity, as opposed to the stamping processes required to form conventional retainers. Such cutting can be achieved, for example, by laser or water jet.

Finally, although in the described embodiment, the retainer 40 is formed of plain carbon steel, other metals including other heat treatments may be employed. For example, the use of spring steel might assure desired level of resilience for satisfactory frictional retention of the assembly 10 against the outer circumferential surface of the valve guide 12, irrespective of the resiliency of the elastomeric ribs 20, for achieving intended purposes.

It is to be understood that the above description is intended to be illustrative, and not limiting. Many embodiments will be apparent to those of skill in the art upon reading the above description. The scope of the invention should be determined, however, not with reference to the above description, but with reference to the appended claims and the full scope of equivalents to which the claims are entitled by law.

What is claimed is:

1. A valve stem seal assembly adapted for insertion over a valve guide having a reciprocally moveable valve stem supported in the guide; said valve stem seal assembly comprising:

a generally cylindrical retainer having a longitudinal axis configured for alignment with the valve stem and the valve guide, said retainer having a body that defines an interior surface, an upper extremity and a lower extremity; wherein said body comprises a straight-walled cross-section extending between said upper and lower extremities;

said assembly further comprising an elastomeric sealing element bonded to said interior surface, wherein said retainer and said sealing element comprise a unitary structure and said elastomeric sealing element comprising an upper body portion selectively contacting the valve stem such that said cylindrical body of said retainer having said straight-walled cross-section contacts said upper body portion.

2. The valve stem seal assembly of claim 1, wherein said elastomeric sealing element comprises an upper body portion and a lower body portion, each of said portions having different diameters.

3. The valve stem seal assembly of claim 2, wherein said upper body portion includes a pair of sealing lips comprising an oil sealing lip and a gas sealing lip longitudinally spaced from one another.

4. The valve stem seal assembly of claim 3, wherein said oil sealing lip effects metering of oil through an interface between said assembly and the valve stem seal as well as for lubrication of the interface between the stem and the guide.

5. The valve stem seal assembly of claim 4, wherein said lower body portion comprises radially oriented annular gripping ribs integral therewith, said ribs adapted to engage the valve guide via interference fit to assure retention of said assembly on the guide.

6. The valve stem seal assembly of claim 5, wherein said plurality of said ribs comprises a resilient radial flexibility in said assembly for accommodating a valve guide diameter tolerance range.

7. The valve stem seal assembly of claim 6 wherein said elastomeric sealing element is chemically bonded to said interior surface of said retainer.

8. The valve stem seal assembly of claim 7 wherein said retainer is formed of a spring metal material.

9. The valve stem seal assembly of claim 8 wherein said retainer is formed of straight-walled steel tubing.

10. The valve stem seal assembly of claim 6 wherein said retainer has a diameter smaller than the largest diameter of the valve guide, wherein the retainer is adapted to be radially inwardly offset from said largest diameter.

11. The valve stem seal assembly of claim 1, wherein said elastomeric sealing element includes at least one sealing lip.

12. The valve stem seal assembly of claim 1, wherein said elastomeric sealing element includes at least one radially oriented annular gripping rib for selective engagement with the valve guide.

13. The valve stem seal assembly of claim 1, wherein said retainer has a diameter less than a diameter of the valve guide, wherein said retainer is adapted to be radially inwardly offset from said diameter of the valve guide.

14. The valve stem seal assembly of claim 1, wherein said retainer has a diameter generally equal to a diameter of the valve guide.

* * * * *